United States Patent

[11] 3,581,787

| [72] | Inventor | John H. Bane<br>Jackson, Tenn. |
|---|---|---|
| [21] | Appl. No. | 846,826 |
| [22] | Filed | Aug. 1, 1969 |
| [45] | Patented | June 1, 1971 |
| [73] | Assignee | Rockwell Manufacturing Company<br>Pittsburgh, Pa. |

[54] TRANSPARENT BASE FOR ROUTER
9 Claims, 7 Drawing Figs.

[52] U.S. Cl. .................................................. 144/134,
144/136, 90/12
[51] Int. Cl. ...................................................... B27c 5/10,
B23c 1/20
[50] Field of Search ............................................ 144/134,
136, 144; 90/12, 12-4

[56] References Cited
UNITED STATES PATENTS

| 1,581,720 | 4/1926 | Carter | 90/12 |
| 2,852,051 | 9/1958 | Bickner | 144/136(-3) |
| 3,106,133 | 10/1963 | Arpaio et al. | 144/134(-5) |

*Primary Examiner*—Donald R. Schran
*Attorney*—Strauch, Nolan, Neale, Nies & Kurz

ABSTRACT: A router comprising a transparent, abrasion resistant, subbase having ribbed sections which engage the workpiece and recessed viewing sections which do not contact the workpiece. The recessed sections function as unabraded and unscratched vision areas which provide an operator with an undistorted view of the cutting action of the tool on the workpiece.

INVENTOR
JOHN H. BANE

BY Strauch Nolan Neale Nies & Kurz
ATTORNEYS

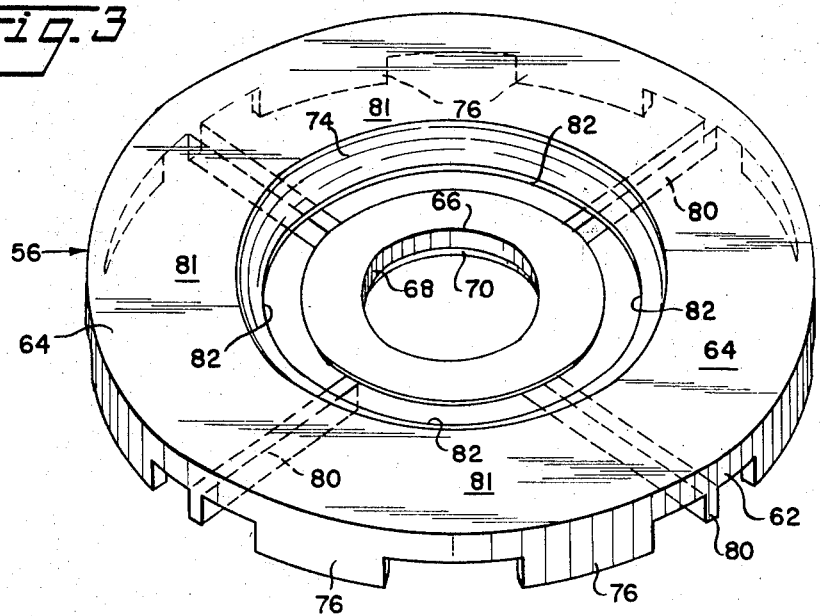
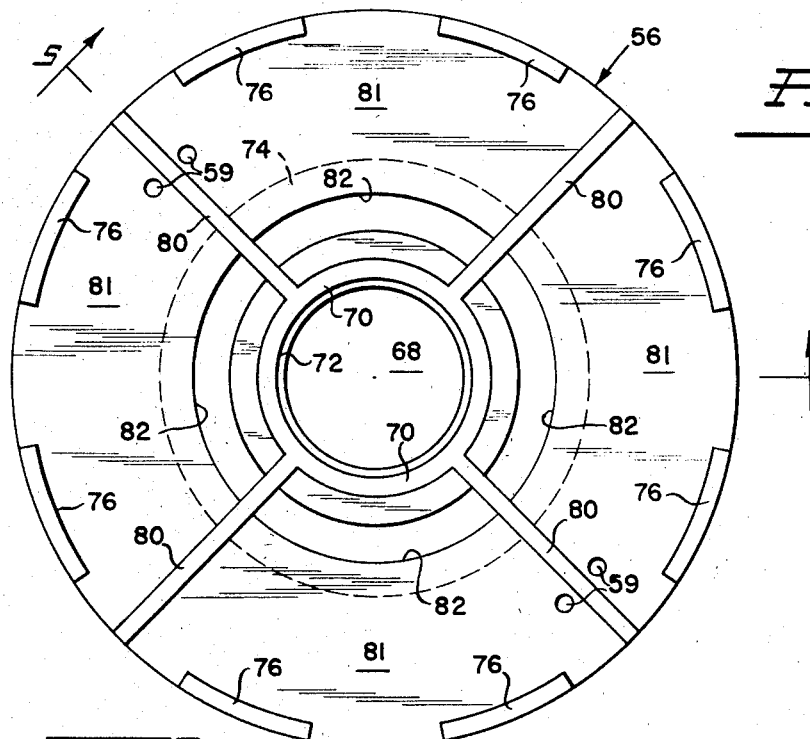
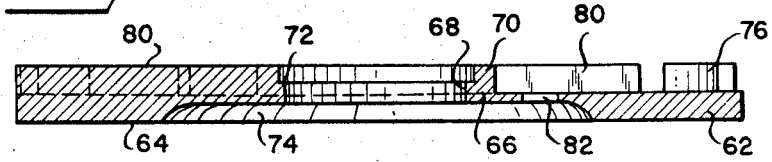
INVENTOR
JOHN H. BANE
ATTORNEYS

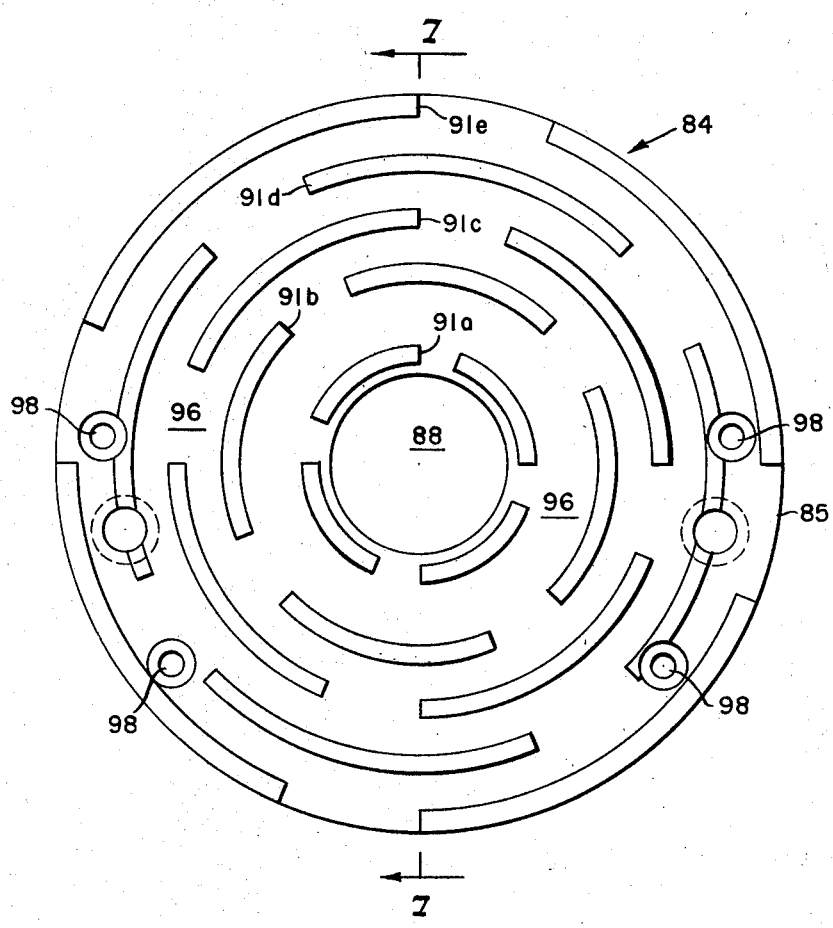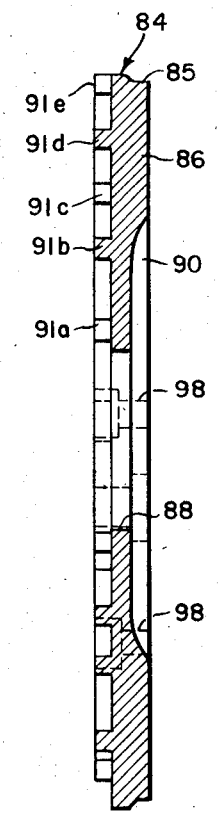

TRANSPARENT BASE FOR ROUTER

BACKGROUND OF THE INVENTION

This invention relates generally to routers and more particularly to a novel improved transparent subbase for a router which enables an operator to visually observe the cutting action of the router tool as it is moved across a workpiece.

For some time, efforts have been made to provide a router with a base structure permitting an operator to clearly observe the cutting tool action during operation thereof. However, such prior efforts have failed to produce a wholly satisfactory base structure because of the abrasive conditions under which the baseplate engages the workpiece, with the abrasive forces scratching the work engaging surface of the baseplate and thereby distorting the visual image therethrough.

SUMMARY OF THE INVENTION

Accordingly, a primary object of the invention resides in the provision of a router structure incorporating a novel base assembly having a transparent baseplate so constructed as to enable an operator to clearly visually observe the cutting action on the workpiece which avoids any abrasive action by the workpiece on the visual areas of the baseplate tending to distort the image through the visual areas.

Another object resides in the provision of a router structure having a novel base assembly including a transparent baseplate having work engaging rib portions on the bottom surface thereof, and recessed vision portions between and radially outwardly of the opening encircling rib portions through which an operator may visually observe the cutting action of the router tool at its point of contact with the workpiece without having the vision distorted by the abrasive action between the contact surfaces of the baseplate and the workpiece.

Still another object resides in the provision of a novel base assembly for a router including a transparent baseplate having ribs which engage the top surface of the workpiece adjacent the cutter and radially outwardly thereof, with recessed areas provided between the ribs out of contact with the workpiece arranged to enable an operator to observe the cutting action through an undistorted vision area.

A further object resides in the provision of a novel inexpensive base assembly for a router including a transparent baseplate of novel construction capable of extensive and long term usage while providing an undistorted vision area through which the cutting action of the router tool on the workpiece may be observed.

Other objects and advantages will become apparent from reading the following description of several embodiments of the invention with, however, the scope of the invention being limited only by the appended claims.

BRIEF DESCRIPTION OF THE DRAWINGS

FIG. 3 is an enlarged perspective view of the preferred embodiment of the baseplate illustrated in FIGS. 1 and 2;

FIG. 4 is a bottom plan view of the baseplate of FIG. 3;

FIG. 5 is a sectional view taken along lines 5—5 of FIG. 4;

FIG. 6 is a bottom plan view of a second embodiment of the novel baseplate of the present invention;

FIG. 7 is a sectional view along lines 7—7 of FIG. 6;

DETAILED DESCRIPTION OF THE PREFERRED EMBODIMENT

Figure 1:
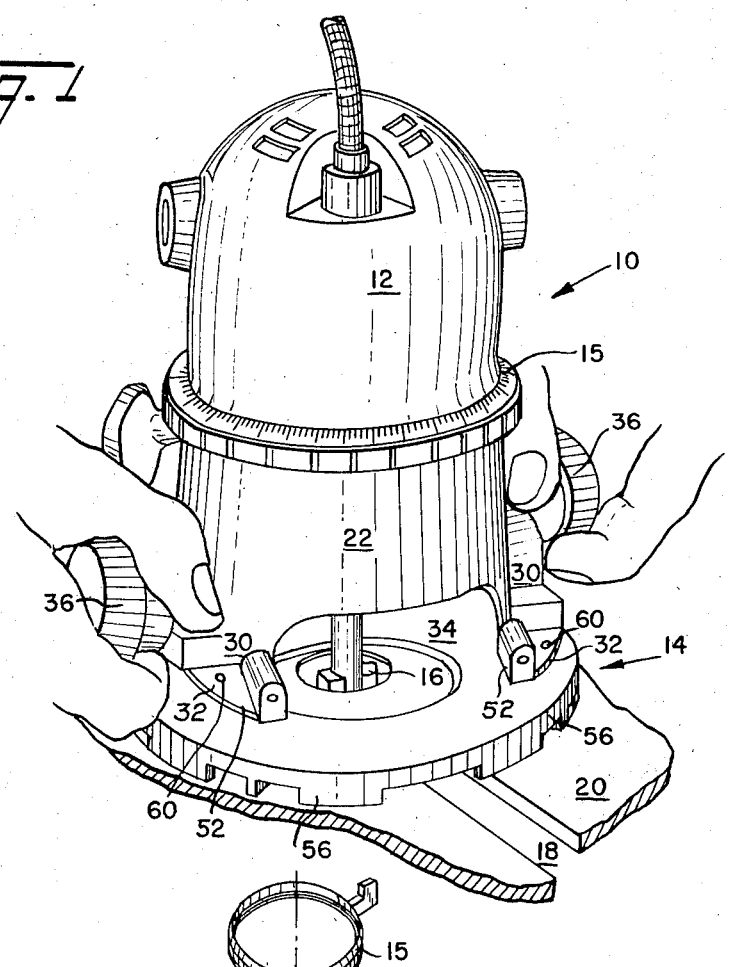
FIG. 1 is a perspective view of a typical router structure incorporating the base assembly and a preferred form of novel baseplate of the present invention.

With reference now to the drawings, the router assembly 10 comprises a conventional router motor 12 conventionally adjustably supported in a base assembly 14 through depth of cut adjustment ring 15 and having a conventional cutting tool 16 for cutting a groove 18 in a workpiece 20 as the router assembly is manually moved across the workpiece.

Figure 2:
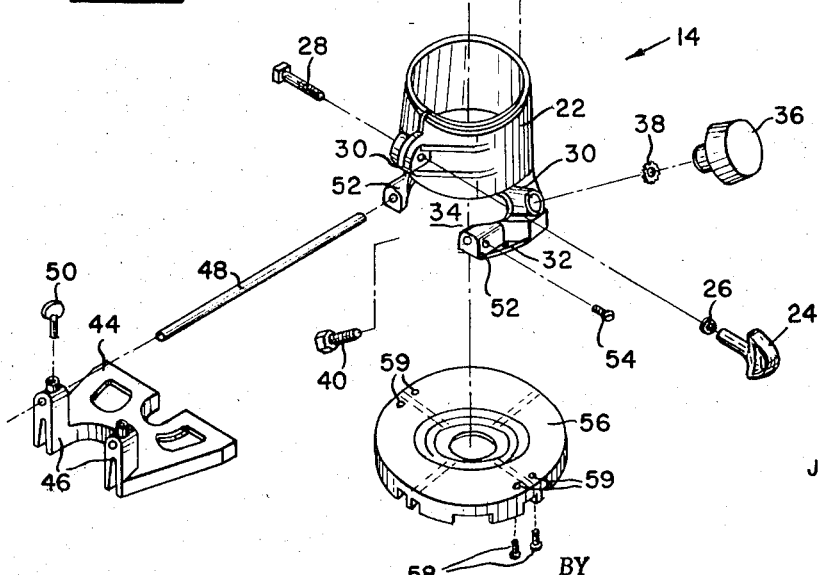
FIG. 2 is an exploded assembly view of the base assembly of FIG. 1.

Referring to FIG. 2, the base assembly 14 is conventional in most respects and includes a generally cylindrical split clamping housing section 22 which receives and supports motor 12, with wing nut 24 and washer 26 cooperating with clamp screw 28 to secure motor 12 within split housing 22. A pair of opposed side posts 30 extend downwardly from clamp housing 22 and mount integral base ring 32. Side openings 34 extend between posts 30 and provide passages through which the wood chips from the cutting area of tool 16 may be continuously expelled.

To enable an operator to firmly grasp router 10, a gripping knob 36 is connected to each of the posts 30 by cooperating lock washer 38 and bolt 40.

Adjusting ring 15 threads on top of housing section 22 in conventional manner to permit adjustment of the depth of cut of cutter 16 as desired.

The router may be provided with a straight gauge accessory unit comprising gauge element 44 having apertured side lugs 46 which receive one end of respective gauge rods 48 (one only being illustrated) fastened thereto by respective thumb screws 50. The other ends of rods 48 extend into apertured side lugs 52 which may be integral with posts 30 and ring 32, with rods 48 being secured in lugs 52 by respective gauge screws 54.

All of the above-described structure of base assembly 14 is conventional, with the novel feature of the invention lying in the construction of a transparent baseplate 56 which is fixedly screw connected to ring 32 by screws 58 extending through plate openings 59 into cooperating screw holes 60 in ring 32.

Referring to FIGS. 3—5, a preferred embodiment of baseplate 56 is illustrated, with the baseplate being constructed of a suitable transparent, abrasion resistant material, preferably a transparent polycarbonate material such as Lexan.

Plate 56 comprises a circular open centered disc portion 62 having a planar upper surface 64 the peripheral marginal area of which engages the bottom flat surface of base ring 32. Disc portion 62 has a dependent central integral cutter receiving hub section 66 (FIG. 5) defining a central opening 68 and a downwardly extending annular rib 70 defining a workpiece engaging surface closely encircling the cutter clearance recess 72. Upper surface 64 is also annularly recessed at 74 around opening 68 inwardly of the marginal area engaging base ring 32 to define a thin see-through inspection area immediately adjacent annular rib 70.

A plurality of spaced, integral, arcuate ribs 76 extend downwardly from the outer bottom surface of disc 62 along its peripheral edge and a plurality of elongated integral ribs 80 extend radially outwardly from annular rib 70 to the peripheral edge of disc 62. The bottom workpiece engaging surfaces of ribs 76 and 80 are coplanar so plate 56 will rest on workpiece 20 in a level position. The areas 81 lying between adjacent ribs 76 and 78 and in part beneath recess 74 serve as unabraded vision areas enabling an operator to observe the cutting action of the tool 16 during operation.

A plurality of part-circular slots 82 located on a common radius from the center of plate 56 and aligned with motor exhaust extend between adjacent radial ribs 80 and through the disc portion defined by recess 74 to increase the chip removal capabilities permitting chips to be removed from the cutting area outwardly through slots 82, recess 74, and router side openings 34.

During operation, the bottom surfaces of ribs 70, 76 and 80 only will engage the workpiece and will be subjected to the abrasive forces existing therebetween as router 10 is moved across the workpiece. However, the vision areas 81, including the thinned disc portion underlying recess 74, because they never contact the workpiece, will not be scratched or abraded and will enable the operator to clearly observe the cutting action in the area of tool 16. This will be true for virtually the service life period of the router.

Referring now to FIGS. 6 and 7, a second embodiment of the invention is illustrated. It comprises a transparent abrasion resistant baseplate 84 comprising disc portion 85 having upper, flat, marginal surface 86, central tool receiving opening 88, and a centered, enlarged upper recess 90 defining a thin see-through area around opening 88.

A plurality of sets 91a, 91b, 91c, 91d and 91e of arcuate, angularly and radially spaced integral ribs extend downwardly from the bottom surface of disc portion 85, with the ribs of each set positioned on a common radius and the ribs of adjacent sets being angularly offset from each other.

As in the embodiment of FIGS. 3—5, the bottom surfaces of all ribs are coplanar and the areas 96 located between the spaced adjacent ribs function as unabraded vision areas in the same manner as areas 81 of the preferred embodiment.

A plurality of bottom countersunk holes 98 are provided in plate 84 to receive screws 58 by which the plate is connected to base ring 32.

In operation the bottom surface of each rib set 91a through 91e will engage the workpiece as the router is moved thereacross with the rib set 91a also closely encircling the line of cut. However, the recessed areas 96, since they do not engage the workpiece, will remain essentially unscratched and unabraded throughout the lifetime of the router, thereby enabling an operator to continuously observe the cutting action in the tool area.

It is apparent, therefore, that the above-described embodiments of the invention accomplish the objects and provide the advantages initially set forth through the use of a relatively simple inexpensive base construction capable of extensive abusive use throughout the lifetime of the tool.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desired to be secured by Letters Patent is:

1. A router comprising a motor, a motor mounted cutting tool, a support base assembly adjustably connected to said motor, said base assembly comprising a baseplate formed of transparent abrasion resistant material having a through opening for passing the cutting tool into cutting position below the plate and dependent, spaced workpiece engaging rib portions on the underface delimiting nonworkpiece engaging see-through portions operable during the operation of the router to expose the cutting tool's engagement with the workpiece to the view of the operator thereby permitting the operator to clearly view the cutting operation and guide the router in its cutting operation.

2. A router as defined in claim 1, wherein certain of said workpiece engaging rib portions are disposed in close encircling relation to said cutting tool.

3. A router as defined in claim 2, wherein said baseplate is circular, others of said workpiece engaging rib portions extend radially from said encircling workpiece engaging rib portions and still others extend arcuately around the periphery of said plate.

4. A router as defined in claim 2, wherein said baseplate is circular and the others of said rib portions are arcuate and located along various radii about the axis of said plate.

5. A router as defined in claim 2, wherein said baseplate radially outwardly from said certain workpiece engaging rib portions is provided with arcuate through opening defining means for increasing the chip removal capabilities of the router.

6. A router work engaging baseplate for removable association with the supporting base ring of a conventional support base assembly comprising a plate formed of transparent abrasion resistant material having a through opening for passing the conventional cutting tool, dependent spaced workpiece engaging rib portions on the underface delimiting nonworkpiece engaging see through portions arranged to expose to the operator's view the line of cut of the cutting tool permitting the operator to clearly view the cutting operation during use of a router fitted with said baseplate, and means including respective through screw openings disposed in angularly spaced peripheral marginal areas of said baseplate for attaching said baseplate to said supporting base ring.

7. The baseplate of claim 6 wherein said through opening is at least partially encircled by dependent rib portions disposed to have bearing contact with the workpiece adjacent the line of cut of the cutting tool.

8. The baseplate of claim 7 wherein the remaining dependent rib portions are of arcuate configuration disposed in respective angularly spaced sets along respectively different radii outwardly of said encircling dependent rib portions.

9. The baseplate of claim 7 wherein the remaining dependent rib portions comprise equiangularly spaced radially directed ribs extending from the encircling dependent rib portions to the plate periphery and respective arcuate rib portions angularly spaced along the peripheral margins of said plate periphery between the outer ends of said radially directed ribs.